United States Patent

[19] Jeffcoat

[11] Patent Number: 6,075,435
[45] Date of Patent: Jun. 13, 2000

[54] AIR CONDITIONER DISCONNECT

[75] Inventor: Walter Jeffcoat, Vidalia, Ga.

[73] Assignee: Thomas & Betts International, Inc., Sparks, Nev.

[21] Appl. No.: 09/285,476

[22] Filed: Apr. 2, 1999

Related U.S. Application Data

[60] Provisional application No. 60/093,173, Jul. 17, 1998.

[51] Int. Cl.⁷ .......................... H01H 85/22; H01H 85/26; H02B 1/18
[52] U.S. Cl. .......................... 337/256; 337/186; 337/189; 337/194; 337/198; 361/630; 361/642
[58] Field of Search ..................... 337/194, 198, 337/208, 211, 186, 189; 361/104, 626, 642, 646, 833, 835, 837, 630; 439/250, 366, 621, 622, 890, 893, 835; 81/3.8

[56] References Cited

U.S. PATENT DOCUMENTS

| | | | |
|---|---|---|---|
| 1,455,566 | 5/1923 | Briggs | 337/256 |
| 2,072,729 | 3/1937 | Corbett | 200/114 |
| 2,186,813 | 1/1940 | Adam et al. | 200/114 |
| 2,617,847 | 11/1952 | Cole | 173/328 |
| 2,907,849 | 10/1959 | Kobryner | 200/119 |
| 3,020,373 | 2/1962 | Kobryner et al. | 200/133 |
| 3,030,474 | 4/1962 | Scott, Jr. | 337/7 |
| 3,284,598 | 11/1966 | George et al. | 200/133 |
| 3,358,100 | 12/1967 | Schleicher | 337/194 |
| 3,379,842 | 4/1968 | Downs et al. | 337/146 |
| 3,418,615 | 12/1968 | Canney | 337/190 |
| 3,732,516 | 5/1973 | Puetz | 337/194 |
| 3,744,003 | 7/1973 | Dipace | 339/31 B |
| 3,993,395 | 11/1976 | Taylor | 339/198 H |
| 4,183,003 | 1/1980 | Cleveland et al. | 337/156 |
| 4,268,107 | 5/1981 | Moerre | 339/147 |
| 4,488,767 | 12/1984 | Lehman et al. | 339/91 |
| 4,559,504 | 12/1985 | Kree | 337/194 |
| 5,240,435 | 8/1993 | Forbrook | 337/211 |
| 5,515,023 | 5/1996 | Marach et al. | 337/213 |

Primary Examiner—Leo P. Picard
Assistant Examiner—Anatoly Vortman
Attorney, Agent, or Firm—G. Andrew Barger

[57] ABSTRACT

A disconnect box is provided in the present invention that has a rear wall and perimetrically bounding side walls connected thereto. A line wire and a load wire are received in the disconnect box, which comprises a line terminal mounted in the disconnect box and to which the line wire is connected, a load terminal mounted in the disconnect box and to which the load wire is connected, and a fuse releasably secured in the disconnect box. The fuse has an operational position wherein the fuse contacts the line terminal and the load terminal thereby creating mechanical and electrical connection between the line wire and first load wire, and a non-operational position such that when the fuse is disconnected from the line terminal and the load terminal the mechanical and electrical connection between the line wire and the load wire is broken.

28 Claims, 11 Drawing Sheets

AIR CONDITIONER DISCONNECT

RELATED REFERENCES

This is patent application claims the benefit of co-pending provisional patent application having Ser. No. 60/093,173, filed Jul. 17, 1998, and entitled: "Improved Air Conditioner Disconnect."

FIELD OF THE INVENTION

In general, the present invention relates to air conditioner disconnects and, more particularly, the present invention relates to an improved air conditioner disconnect where the fuses make and break contact in the disconnect box by being inserted and removed, respectively, because the fuses are held within a puller unit. There is therefore no need for expensive fuse clips and other parts found in typical disconnects.

BACKGROUND

Currently, there are two types of fused air conditioner disconnects on the market. The first type has long projections extending from the rear side of the puller unit that are inserted into receptacles, which, in turn, are coupled to respective line and load terminals. This insertion of the puller unit forms a bus bar such that the line wires are connected to the line terminals, which are coupled to the bus bar, the bus bar is connected to the fuses that are connected to the load terminals, and finally, to complete the circuit, the load terminals are connected to the load wires.

The second type of fused air conditioner disconnect includes a pull header with prongs extending downward therefrom, which, when the header is removed from the disconnect box breaks contact between the line terminal and fuses. In this type of disconnect the line wires are secured in the line terminals that are in communication with the prongs of the pull header, which, in turn are in contact with the fuses. The fuses, at the other end, are in contact with the load terminals to which the load wires are secured therein.

It is apparent that both of air conditioner disconnects are difficult to assemble, involve a great number of parts, and are costly. Moreover, each of these disconnects do not have an internal shield current carrying components. If the interior of the disconnect box is accessible, the energized components are exposed creating a potentially dangerous condition.

It would therefore be desirable to have the fuses of the disconnect box make and break the circuit alone and thereby eliminate the need for bus bars and puller headers with prongs. It would also be desirable to eliminate expensive fuse clips, to have indicia that notify a technician visually and through feel when the disconnect box is operational or non-operational, and provide a way for assemblers of the disconnect box to "snap fit" components of the box into its interior. It would also be desirable to have an internal shield or plate such that the energized components are not exposed if the interior of the box is accessible.

SUMMARY OF THE INVENTION

A disconnect box is provided in the present invention that has a rear wall and perimetrically bounding side walls connected thereto. A line wire and a load wire are received in the disconnect box, which comprises a line terminal mounted in the disconnect box and to which the line wire is connected, a load terminal mounted in the disconnect box and to which the load wire is connected, and a fuse releasably secured in the disconnect box. The fuse has an operational position wherein the fuse contacts the line terminal and the load terminal thereby creating mechanical and electrical connection between the line wire and first load wire, and a non-operational position such that when the fuse is disconnected from the line terminal and the load terminal the mechanical and electrical connection between the line wire and the load wire is broken.

One advantage of the present invention is that the fuse remains releasably secured in the disconnect box, and may be visually inspected, when in the non-operational position. A first component is provided in the disconnect box wherein the line terminal is mounted and a second component wherein the load terminal is mounted. The first and the second components are spaced apart from each other and snap-fit into the rear wall of the disconnect box.

Another advantage of the present invention is that a puller unit is provided for placing the fuse in the operational position and the non-operational position. The fuse is releasably secured in the puller unit, and the puller unit comprises a plate for blocking access to the line and the load terminals and the line and the load wires within the disconnect box when the fuse is in the operational position and the non-operational position. The plate further comprises a front face and a rear face each having an indicia disposed thereon for indicating whether the fuse is in the operational position or the non-operational position. The plate also has a first slot and a second slot disposed therein. And, a first projection is disposed in the disconnect box for being received in the first slot when the puller unit is inserted into the disconnect box and a second projection also disposed in the disconnect box for being received in the second slot when the puller unit is inserted into the disconnect box.

Another advantage is that the fuse is releasably secured in a box, which is integrally formed with the puller unit, via snap-fit. The box includes at least one tab for biasing the fuse against the line and the load terminals. And, the line and the load terminals have a concave side for complimentarily contacting the fuse. The fuse can also be releasably secured in a cylinder via sliding engagement.

DETAILED DESCRIPTION OF THE PREFERRED EMBODIMENT(S)

Figure 1:
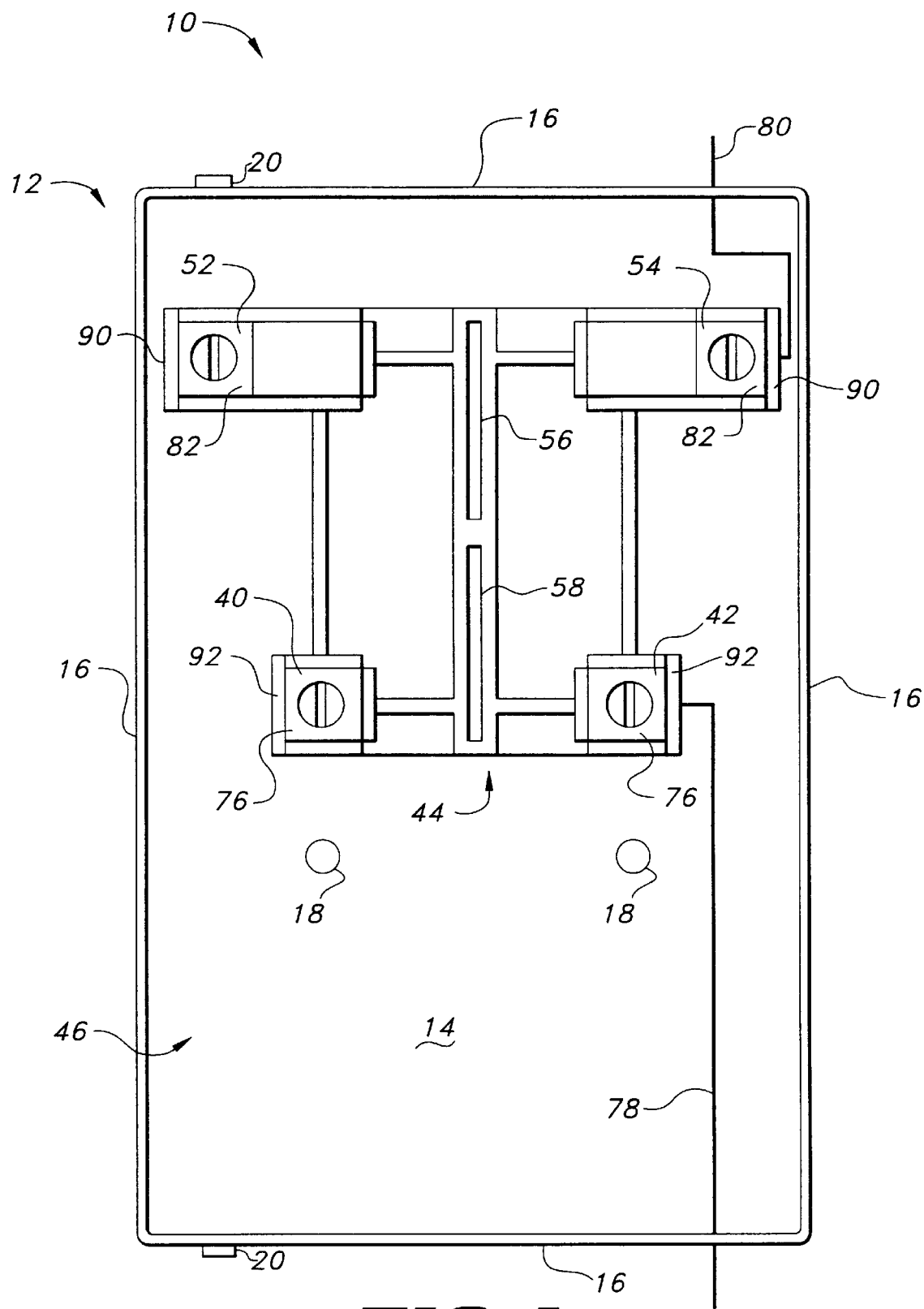
FIG. 1 is a plan view of a disconnect box of a first embodiment of the present invention.

The above and other features, aspects, and advantages of the present invention will now be discussed in the following detailed description and appended claims, which are to be considered in conjunction with the accompanying drawings in which identical reference characters designate like elements throughout the views.

The present invention eliminates the above difficulties and disadvantages by providing an improved air conditioner disconnect 10 that greatly simplifies the number of parts and assembly process of the disconnect 10. In particular, a first embodiment of the present disconnect 10, shown in FIGS. 1–4, discloses a disconnect box 12 with a rear wall 14 that is perimetrically bounded by side walls 16 that are integrally formed therewith. It is understood that the disconnect box 12 is preferably cast of non-corrosive aluminum and has two spaced apart apertures 18 disposed in the rear wall 14 for receiving screws, bolts, or nails therethrough for inserting into a wall of a structure. The box 12 also includes a plurality of "punch outs 20" disposed on the side walls 16, which, when removed, line and load wires 80, 78 are inserted through punch out apertures 98 and into the disconnect box 12.

Figure 2:
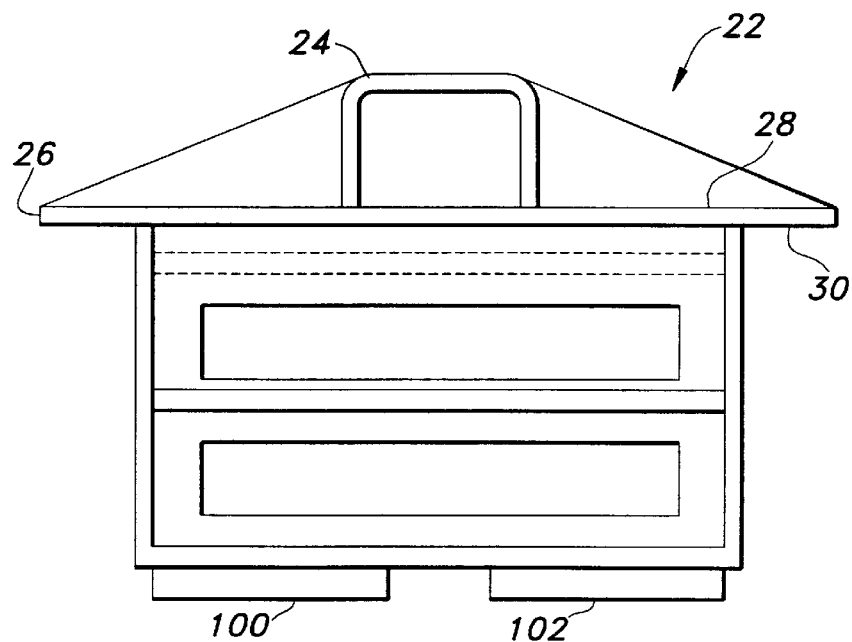
FIG. 2 is a side elevational view of a puller unit of the present invention.

As shown in FIG. 2, the disconnect box 12 has a puller unit 22, preferably made of NORYL plastic manufactured by the General Electric Company of the United States, which includes a plate 26 having a front face 28 with a handle 24 integrally formed therewith for grasping by a technician and a rear face 30 with first and second diagonally adjacent, open ended, rectangular boxes 32, 34 each having an open side 36. The first rectangular box 32 receives a first cylindrical fuse 64 in the open side 36 by snap fit. And, the second rectangular box 34 receiving a second cylindrical fuse 66 in the open side 36 by "snap fit." It is understood, however, that the first and second fuses 64, 66 could be retained by friction fit.

Figure 3:
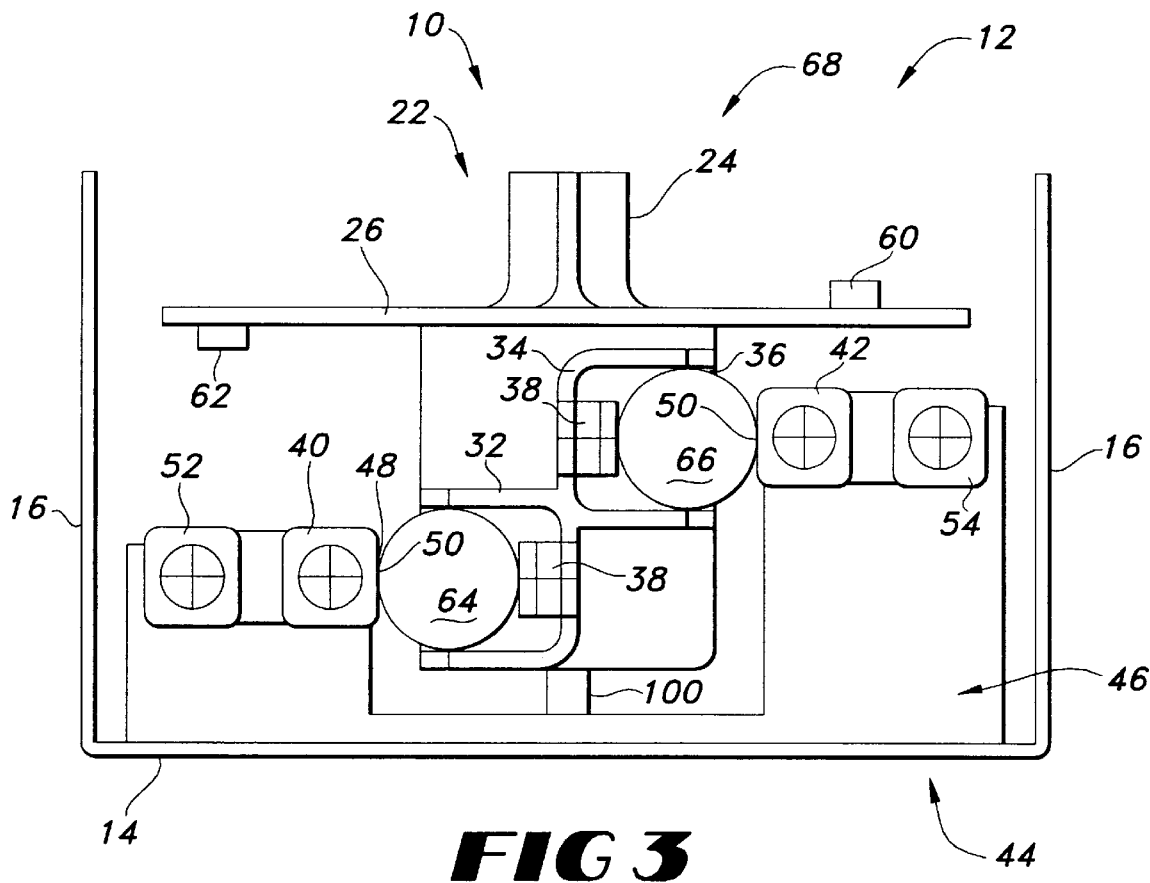
FIG. 3 is a side elevational view of the puller unit in an operational position in the interior of the disconnect box showing load terminals in communication with first and second fuses.
Figure 4:
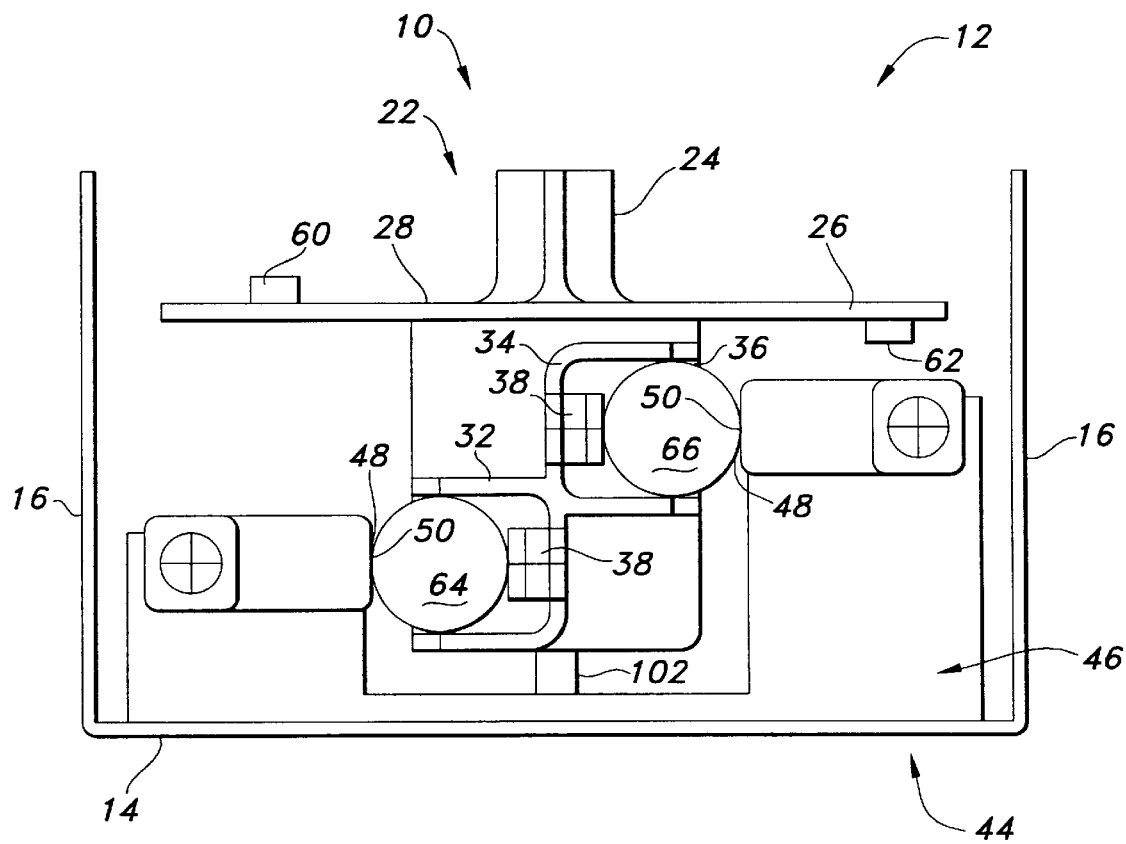
FIG. 4 is a side elevational view of the puller unit in an operational position in the interior of the disconnect box showing line terminals in communication with first and second fuses.

As shown in FIGS. 3 and 4, the plate 26 of the puller unit 22 is rectangular and serves as a shield against access to energized components in the interior 46 of the disconnect box 12. The plate 26 remains in place at all times while the disconnect box 12 is operational. There is neither busing nor fuse holders in the present embodiment, which greatly reduces costs and complexity of installation. Further, screws are not required to connect a fuse contact member 110 to the terminals, thereby providing a disconnect box 12 interior 46 without screws required for assembly.

Mounted on the interior 46 of the disconnect box 12 is a base 44, as is best shown in FIG. 1, which is preferably made of NORYL plastic also manufactured by the General Electric Company of the United States. The base 44 preferably "snap fits" into the rear wall 14 of the disconnect box 12 by a plurality of flanges 72 formed on the first component 94 that are inserted through corresponding apertures 74 disposed in the rear wall 14.

As shown in FIG. 1, first and second load terminals 40, 42 or connectors are mounted in the base 44 on the interior 46 of the disconnect box 12. In particular, the first and second load terminals 40, 42 are each mounted in a load receptacle 92 by compression fit. The first and second load terminals 40, 42 have a concave side 48, as shown in FIGS. 3 and 4, with a radius of curvature complimentary to the convex or round end 50 of each fuse thereby providing a large contact surface between the fuse end and terminal. The first and second load terminals 40, 42 are preferably constructed of copper for high electrical conduction and each has a load lug 76 formed therein for receiving a load wire 78. A screw or bolt is inserted into the load terminals 40, 42 for securing the load wires therein and making electrical connection between the wires and terminals. Integrally formed in the first and second rectangular boxes 32, 34, is a tab 38, at each end. Each tab 38 is compressed when an associated end of a fuse contacts an associated load terminal, thereby providing contact force between the fuse and the first and second load terminals 40, 42, which are elevated from the rear wall 14 of the box 12. Each tab 38 is constructed of a non-electrically conductive material such as a thermo-formed plastic.

In addition, first and second line terminals 52, 54 are mounted in the base 44. In particular, each of the first and second line terminals 52, 54 are each mounted in a line terminal receptacle 90 by compression fit. The first and second line terminals 52, 54 are elongated and have a convex side with a radius of curvature complimentary to the convex or round end 50 of each fuse thereby providing a large contact surface between the fuse end and terminal. The first and second line terminals 52, 54 are preferably constructed of copper and each have a line lug 82 formed therein for each receiving a line wire. A screw or bolt is inserted into the line terminals 52, 54 for securing the line wires therein. The line terminals 52, 54 are also elevated from the rear wall 14 of the box 12. In particular, the first line and load terminals 52, 40 are elevated a first set distance from the rear wall 14 for contacting the first fuse 64 and the second line and load terminals 54, 42 are elevated at a second set distance from the rear wall 14 for contacting the second fuse 66.

As shown in FIG. 1, first and second spaced apart, elongated slits 56, 58 are provided in the base 44 for receiving first and second insertion members 100, 102 therein, respectively, therein, which are integrally formed in the pullout unit. The first and second insertion members 100, 102 are of preferably equal lengths, as are the associated slits. An outer raised indicia 60 is formed on the front face 28 of the puller unit 22, such as "ON" or "OPERATIONAL," for indicating to the technician that the disconnect 10 is operational and an inner raised indicia 62 is provided on the rear face 30 indicating to the technician that the disconnect 10 is non-operational, such as "OFF" or "NON-OPERATIONAL." The inner and outer indicia 62, 60 are in one orientation only, such that if the technician cannot read it, it will be apparent that the puller unit 22 is installed incorrectly in either the operational position 68 or non-operational position 70.

In operation, the technician removes the puller unit 22, thereby disconnecting the fuses and the connection between the line and load wires 80, 78. The puller unit 22 will then be inserted back into the disconnect box 12 with the fuses contained in the puller unit 22 facing outwards, thereby providing yet another visual indication to the technician that the disconnect 10 is in the non-operational position 70. As shown in FIGS. 3 and 4, the first and second fuses 64, 66 extend in parallel planes but are disposed diagonally adjacent each other.

In a second embodiment, as shown in FIGS. 5–11, the present disconnect 10 discloses a disconnect box 12 with a rear wall 14 that is perimetrically bounded by side walls 16 that are integrally formed therewith. It is understood that the disconnect box 12 is preferably cast of non-corrosive aluminum and has two spaced apart apertures 18 disposed in a wall thereof for receiving screws or bolts therethrough for inserting into a wall of a structure. The box 12 also includes a plurality of "punch outs 20," as shown in FIGS. 5, 6, 7, 10, and 11, disposed in the side walls 16, which, when removed allow for the insertion of the line and load wires 80, 78 into the box 12 through punch out apertures 98.

The disconnect box 12 includes a puller unit 22, as shown in FIGS. 6, 7, 11, and 12, preferably made of NORYL plastic manufactured by the General Electric Company of the United States, which includes a plate 26 having a front face 28 with a handle 24 integrally formed therewith for grasping by a technician and a rear face 30 having a first cylinder 104 and a second cylinder 106 formed thereon for slidingly receiving a first fuse 64 and a second fuse 66 therein, respectively. The first and second cylinders 104, 106 are parallel and spaced apart. The puller unit 22 is generally rectangular and the plate 26 serves as a shield against access to energized components in the interior 46 of the disconnect box 12. The plate 26, therefore, remains in place at all times while the disconnect box 12 is operational. There is neither busing nor fuse holders in the present embodiment, which greatly reduces costs and complexity of installation. A tang 88 is formed at one end of the parallel cylinders 104, 106 on which the fuses 64, 66 abut when slid into the cylinders 104, 106.

Figure 12:
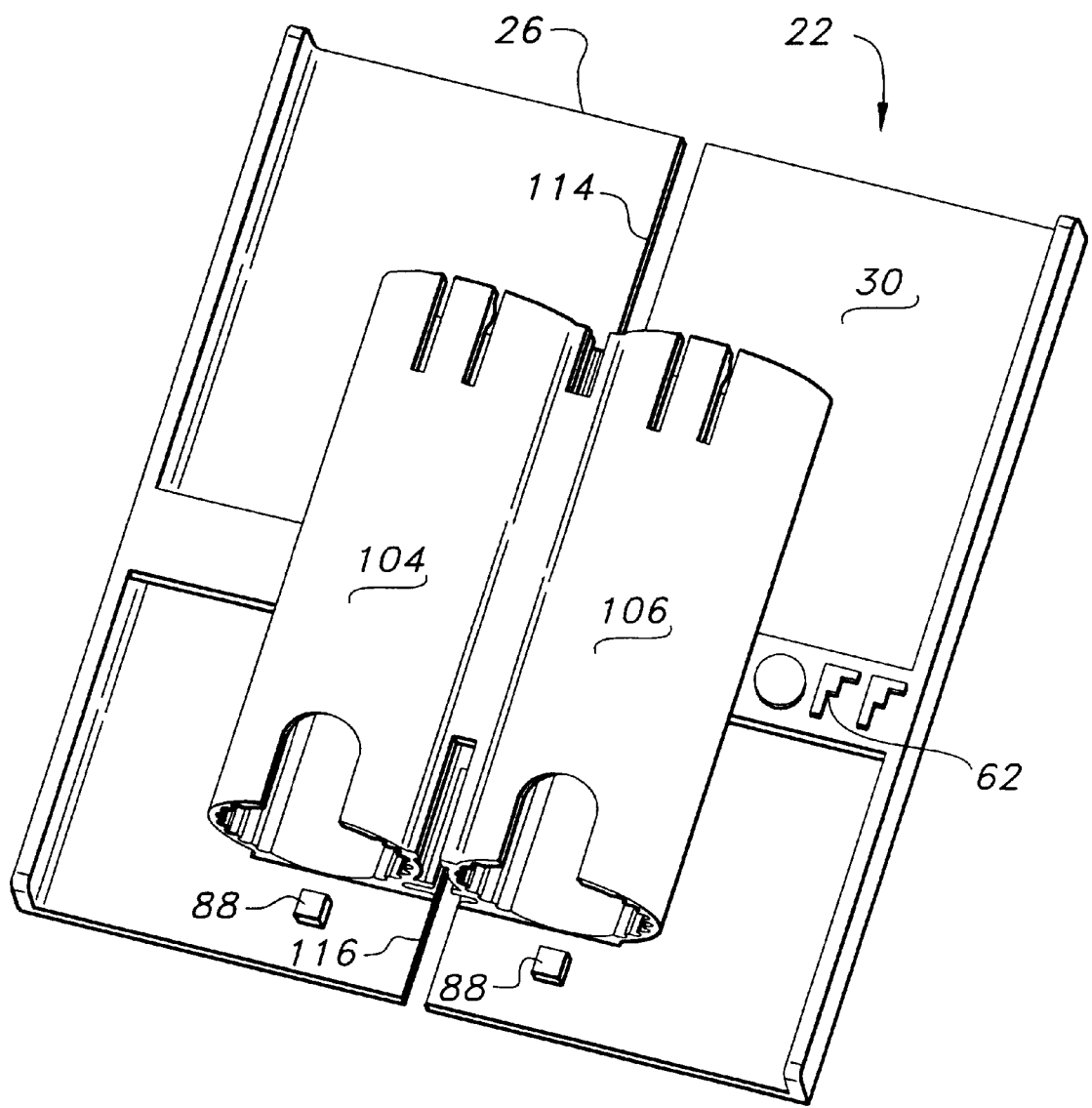
FIG. 12 is a perspective view of a rear face of the puller unit showing cylinders for slidingly receiving fuses therein.

First and second spaced apart, elongated slots 114, 116, as best shown in FIG. 12, are provided in the puller unit 22 for receiving first and second projections 84, 86, respectively, therein, which are disposed in the disconnect box 12. The first and second projections 84, 86 are of different lengths, as are the associated slots 114, 116 such that positive insertion of the puller unit 22 and the first and second fuses 64, 66 contained therein, is obtained by sight and tactile feel. An outer raised indicia 60 is also provided on the front face 28 of the puller unit 22, such as "ON" or "OPERATIONAL," for indicating to the technician that the disconnect 10 is operational and similarly a inner raised indicia 62 is provided on the rear face 30 of the plate 26, such as "OFF" or "NON-OPERATIONAL," for indicating to the technician that the disconnect 10 is non-operational. The raised indicia 60, 62 are in one orientation only, such that if the technician cannot read it, it will be apparent that the puller unit 22 is installed incorrectly in either the operational or non-operational position 68, 70.

Figure 7:
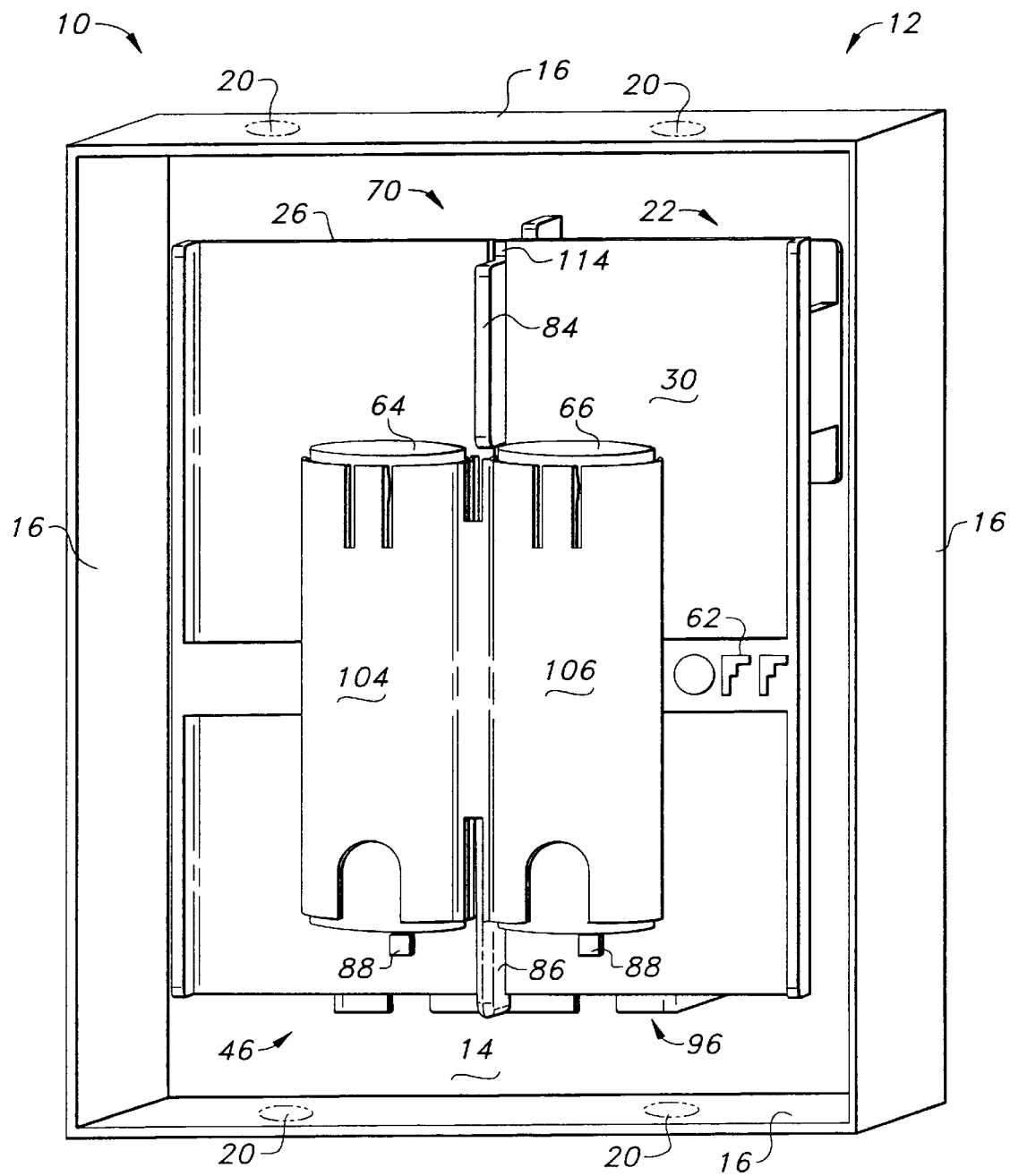
FIG. 7 is a perspective view of the interior of the disconnect box of the present invention with the puller unit in a non-operational position.

In operation, the technician will remove the puller unit 22, thereby disconnecting the fuses 64, 66 and the connection between the line and load wires 80, 78. The puller unit 22 will then be inserted back into the disconnect box 12 with the projections being inserted through the slots 114, 116, the first and second fuses 64, 66 contained in the puller unit 22 facing outwards, and the handle 24 inserted between the first and second components 94, 96, thereby providing yet another visual indication to the technician that the disconnect 10 is in the non-operational position 70, as shown in FIG. 7.

Figure 5:
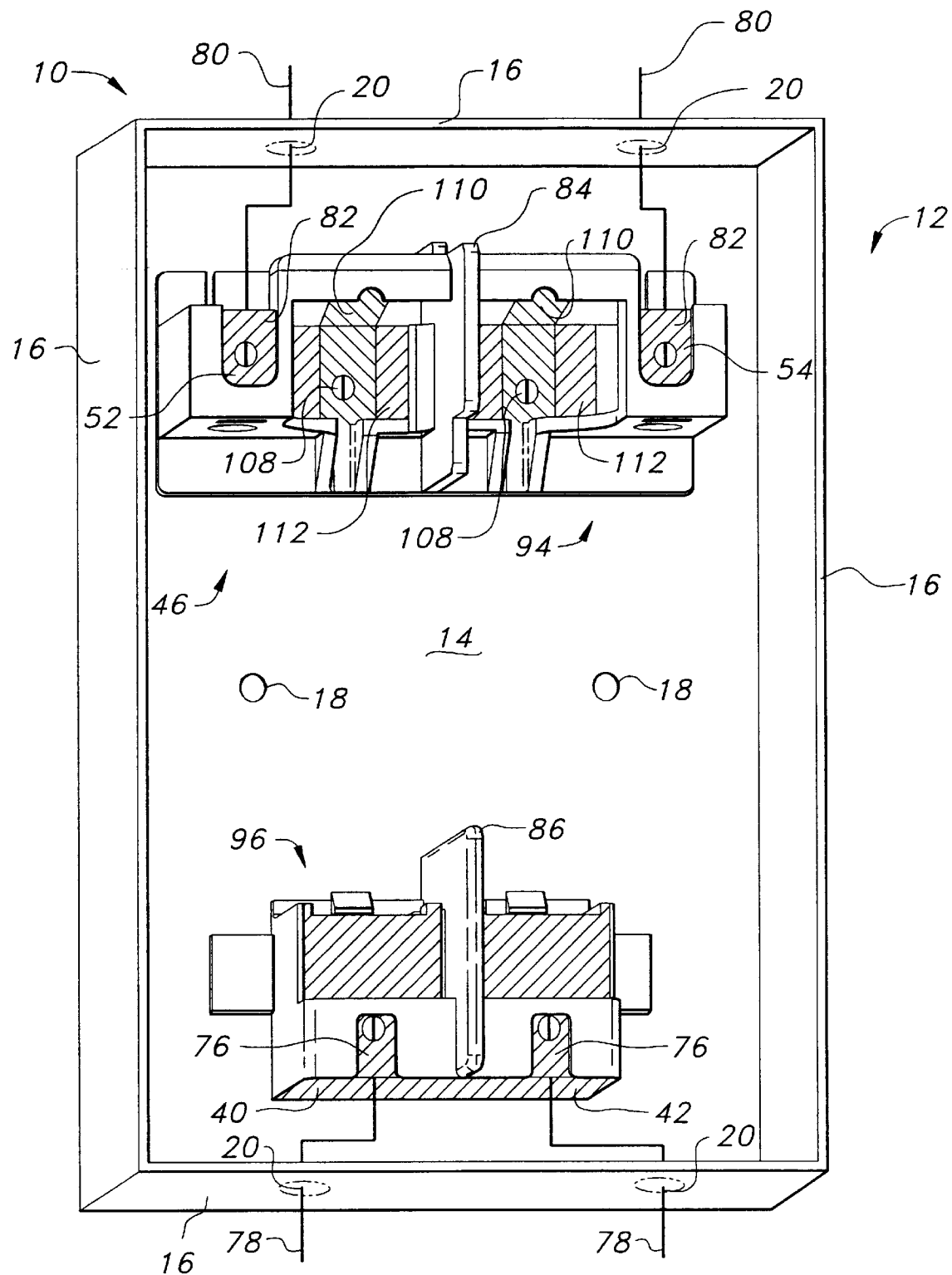
FIG. 5 is a perspective view of a second embodiment of the interior of the disconnect box of the present invention.
Figure 6:
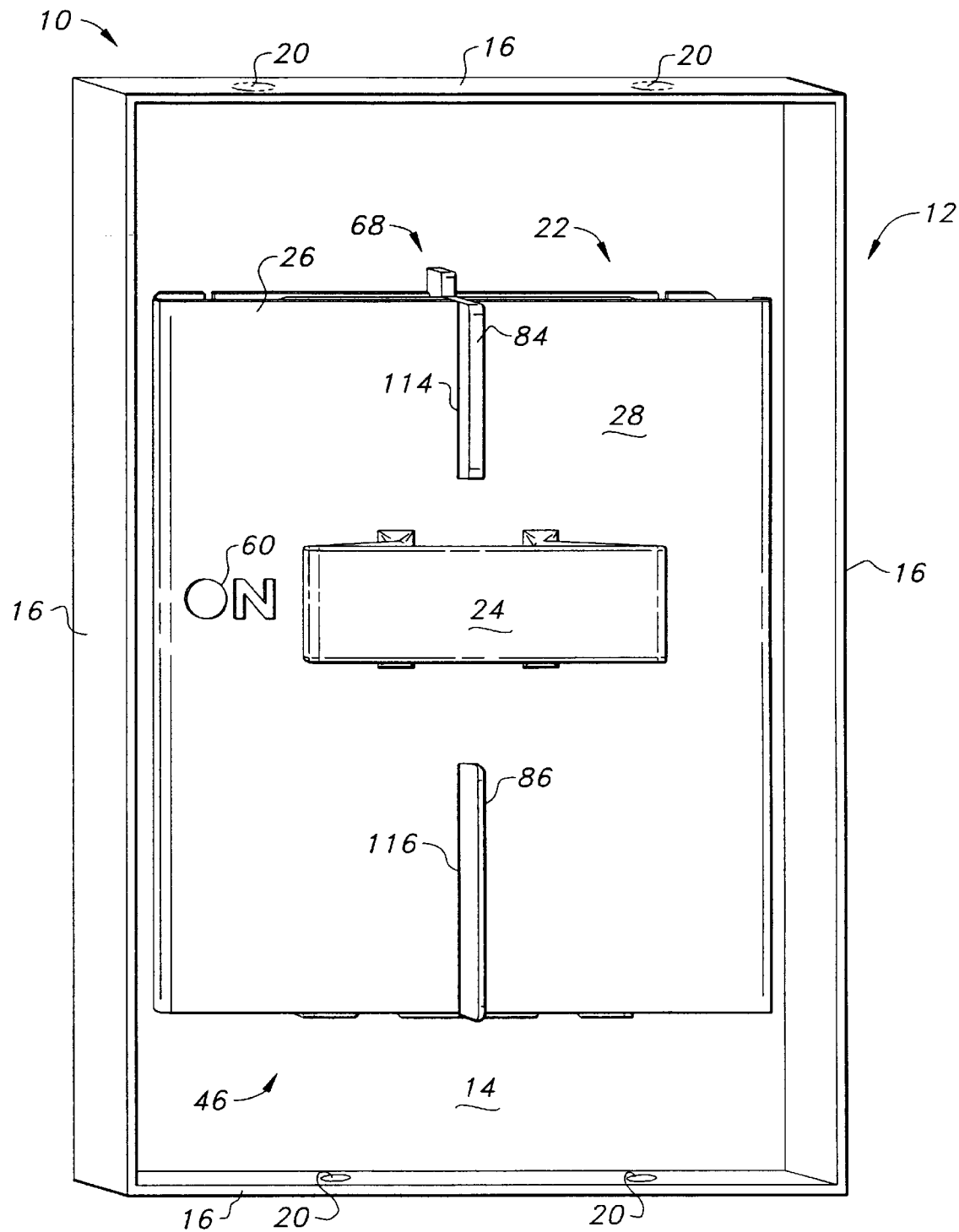
FIG. 6 is a perspective view of the interior of the disconnect box of the present invention with the puller unit in the operational position.
Figure 9:
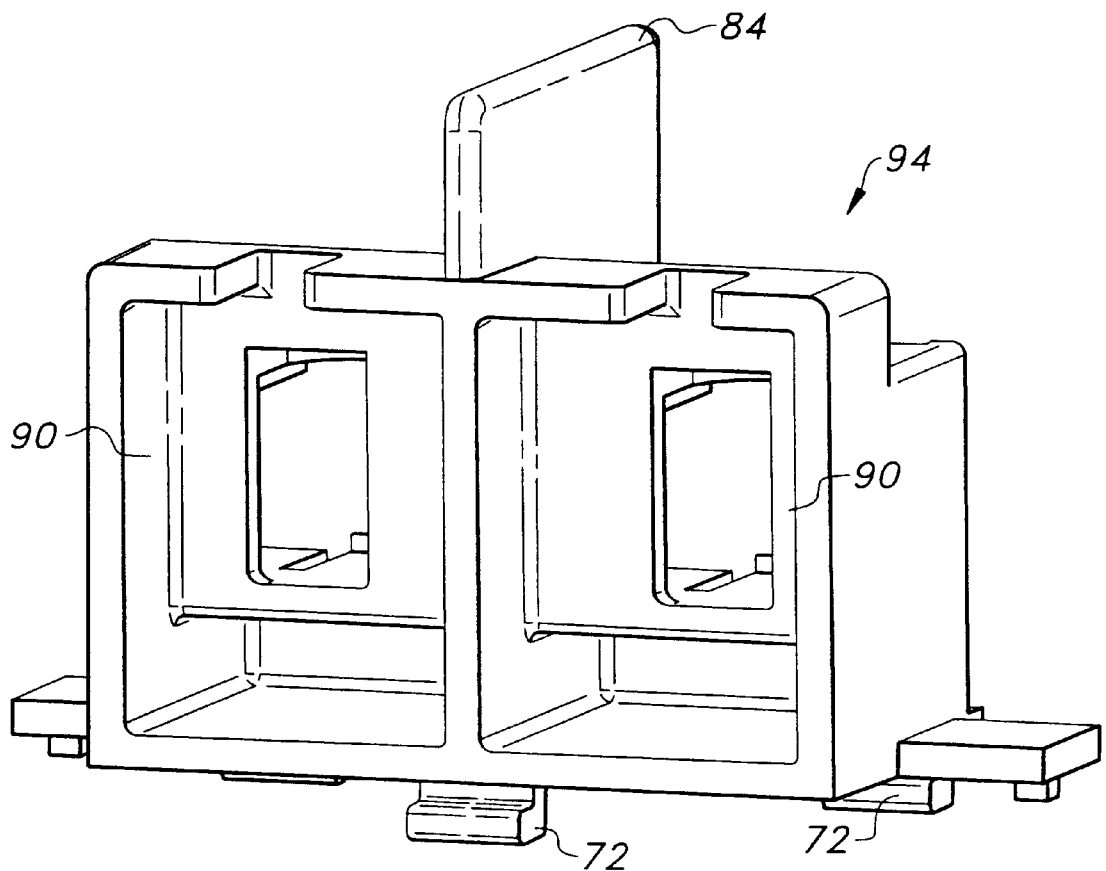
FIG. 9 is a perspective view of a first component of the present invention, in which load terminals are mounted.

As is best shown in FIG. 5, the interior 46 of the disconnect box 12 has two main components. The first component 94 has the first projection 84 integrally formed therewith and includes first and second, spaced apart, L-shaped line terminals 52, 54 each having a line lug 82 formed therein for receiving a line wire. The terminals 52, 54 are each mounted in a line terminal receptacle 90 by compression fit. The empty receptacle 90 is shown in FIG. 9. A screw or bolt is inserted into the first and second line terminals 52, 54 for securing the line wires therein.

Mounted on an extension 112 of the first and second line terminals 52, 54, via screw 108, is a preferably copper, fuse contact member 110 for abutting against, creating electrical and mechanical communication with, one end of first and second fuses 64, 66 when the puller unit 22 is installed in the operational position 68. The first component 94 is also preferably made of NORYL plastic manufactured by the General Electric Company of the United States. The first component 94 "snap fits" into the rear wall 14 of the disconnect box 12 by a plurality of flanges 72 formed on the first component 94 that are inserted through corresponding apertures 74 disposed in the rear wall 14.

Figure 8:
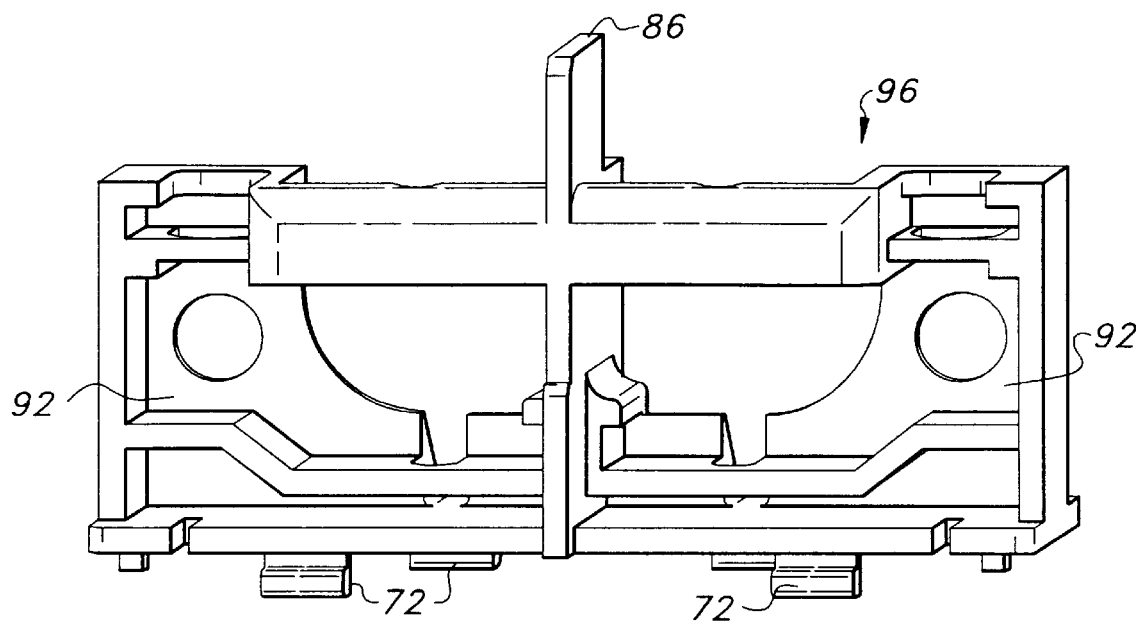
FIG. 8 is a perspective view of a first component of the present invention, in which line terminals are mounted.
Figure 10:
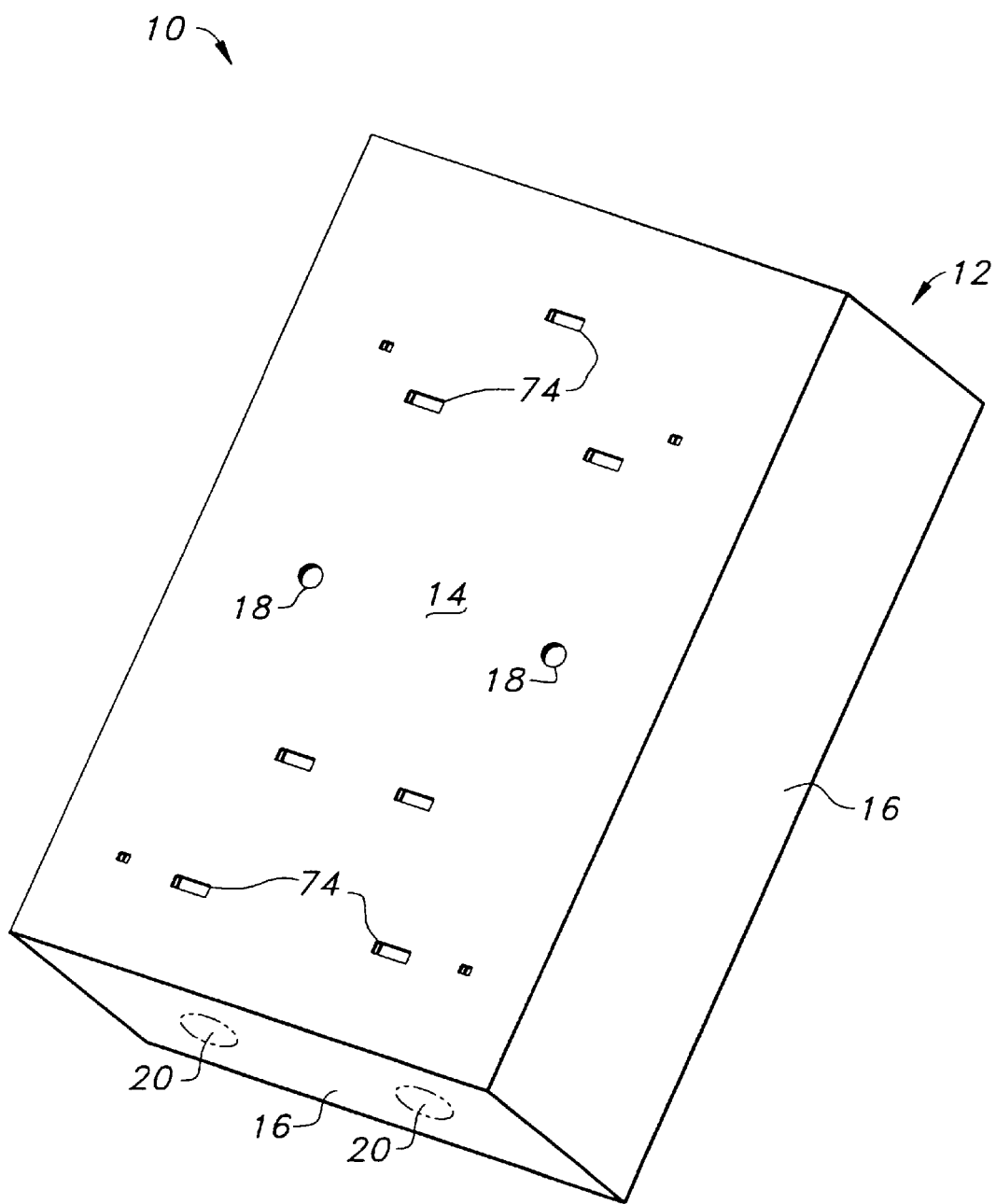
FIG. 10 is a perspective view of a rear wall of the disconnect box of the present invention.
Figure 11:
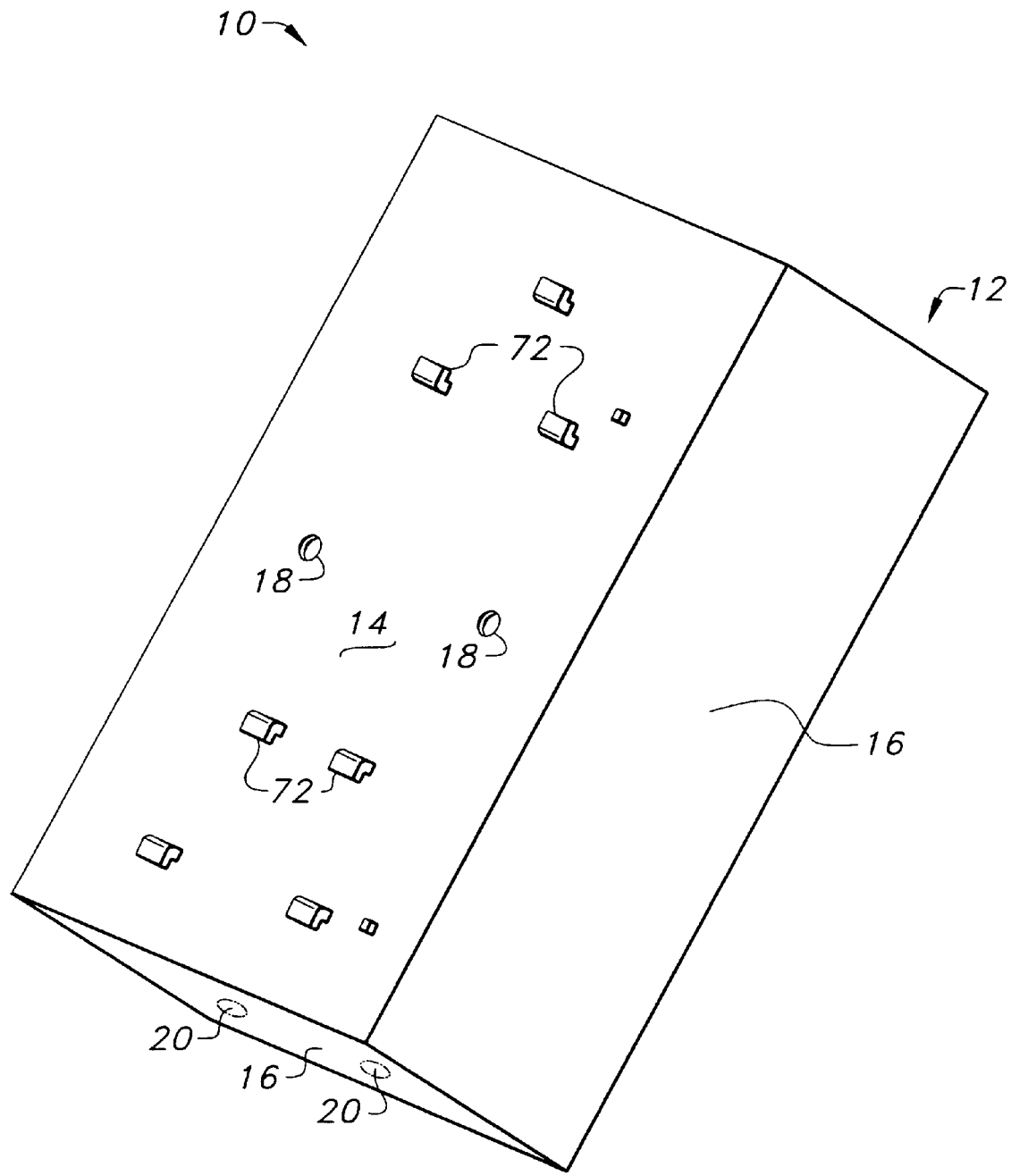
FIG. 11 is a perspective view of the rear wall of the disconnect box of the present invention with a plurality of flanges inserted through apertures in the rear wall.

The second component 96 has the second projection 86 integrally formed therewith and includes first and second, spaced apart load terminals 40, 42, preferably constructed of copper, each having a load lug 76 formed therein for receiving a load wire 78. The load terminals 40, 42 are each mounted by compression fit into a load terminal receptacle 92. The empty receptacle 92 is shown in FIG. 8. The first and second load terminals 40, 42 include a preferably copper, fuse contact member 110 integrally formed therewith for abutting against, creating electrical and mechanical communication with, one end of a fuse when the puller unit 22 is installed in the operational position 68. A screw or bolt is inserted into the load terminals 40, 42 for securing the load wires therein. The first component 94 is also preferably made of NORYL plastic manufactured by the General Electric Company of the United States. The second component 96 "snap fits" into the rear wall 14 of the disconnect box 12 by a plurality of flanges 72 formed on the second component 96 that are inserted through corresponding apertures 74 disposed in the rear wall 14, as shown in FIGS. 10 and 11.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A disconnect box having a rear wall and perimetrically bounding side walls connected thereto and having a line wire and a load wire received therein, the disconnect box comprising:

a line terminal mounted in the disconnect box and to which the line wire is connected;

a load terminal mounted in the disconnect box and to which the load wire is connected; and a puller unit releasably securable to the disconnect box and having;

a front face, and a rear face;

a fuse releasably secured to the rear face of the puller unit and having:

an operational position wherein the fuse is disposed within the disconnect box and contacts the line terminal and the load terminal thereby creating mechanical and electrical connection between the line wire and the load wire, and a non-operational position with the fuse disconnected from either the line terminal or the load terminal and the mechanical and electrical connections between the line wire and the load wire are broken; and wherein when the fuse is in the non-operational position it is disposed at least partially outside of the disconnect box for visual inspection and remains releasably secured in the puller unit for servicing such that the rear face of the puller unit is facing into the disconnect box and the front face is facing away from the disconnect box with the puller unit releasably secured in the disconnect box.

2. The disconnect box of claim 1 further comprising a first component wherein the line terminal is mounted.

3. The disconnect box of claim 2 further comprising a second component wherein the load terminal is mounted.

4. The disconnect box of claim 3 wherein the first and the second components are spaced apart from each other in the disconnect box.

5. The disconnect box of claim 3 wherein the first and the second components are snap-fit into the rear wall of the disconnect box.

6. The disconnect box of claim 1 wherein the fuse is releasably secured in the puller unit.

7. The disconnect box of claim 1 wherein the puller unit comprises a plate for blocking access to the line and the load terminals and the line and the load wires within the disconnect box when the fuse is in the operational position and the non-operational position.

8. The disconnect box of claim 7 wherein the plate comprises a front face and a rear face each having an indicia disposed thereon for indicating whether the fuse is in the operational position or the non-operational position.

9. The disconnect box of claim 7 wherein the plate has a first slot and a second slot disposed therein.

10. The disconnect box of claim 9 further comprising a first projection disposed in the disconnect box for being received in the first slot when the puller unit is inserted into the disconnect box and a second projection also disposed in the disconnect box for being received in the second slot when the puller unit is inserted into the disconnect box.

11. The disconnect box of claim 6 wherein the fuse is releasably secured in a box, which is integrally formed with the puller unit, via snap-fit.

12. The disconnect box of claim 11 further including at least one deformable tab disposed in the puller unit for biasing the fuse against the line and the load terminals.

13. The disconnect box of claim 1 wherein the line and the load terminals have a concave side for contacting the fuse.

14. The disconnect box of claim 6 wherein the fuse is releasably secured in a cylinder, which is integrally formed with the puller unit, via sliding engagement.

15. The disconnect box of claim 14 wherein the puller unit includes a tang for positively locating the fuse within the cylinder.

16. A disconnect box having a rear wall and perimetrically bounding side walls connected thereto and having a first line wire, a second line wire, a first load wire, and a second load wire received therein, the disconnect box comprising:

a first line terminal mounted in the disconnect box and to which the first line wire is connected;

a second line terminal mounted in the disconnect box and to which the second line wire is connected;

a first load terminal mounted in the disconnect box and to which the first load wire is connected;

a second load terminal mounted in the disconnect box and to which the second load wire is connected;

a puller unit releasably securable to the disconnect box and having;

a front face, and a rear face;

a first fuse releasably secured to the rear face of the puller unit and having an operational position wherein the first fuse is disposed within the disconnect box and contacts the first line terminal and the first load terminal thereby creating mechanical and electrical connection between the first line wire and the first load wire, and a non-operational position with the first fuse disconnected from the first line terminal and the first load terminal and the mechanical and electrical connections between the first line wire and the first load wire are broken;

a second fuse releasably secured to the rear face of the puller unit and having an operational position wherein the second fuse is disposed within the disconnect box and contacts the second line terminal and the second load terminal thereby creating mechanical and electrical connection between the second line wire and the second load wire, and a non-operational position with the second fuse disconnected from the second line terminal and the second load terminal and the mechanical and electrical connections between the second line wire and the second load wire are broken; and wherein when the first and the second fuses are in the non-operational position they are disposed at least partially outside of the disconnect box for visual inspection and remain releasably secured in the puller unit for servicing such that the rear face of the puller unit is facing into the disconnect box and the front face is facing away from the disconnect box with the puller unit releasably secured in the disconnect box.

17. The disconnect box of claim 16 further comprising a first component wherein the first and the second line terminals are mounted.

18. The disconnect box of claim 17 further comprising a second component wherein the first and the second load terminals are mounted.

19. The disconnect box of claim 18 wherein the first and the second components are spaced apart from each other in the disconnect box.

20. The disconnect box of claim 18 wherein the first and the second components are snap-fit into the rear wall of the disconnect box.

21. The disconnect box of claim 16 wherein the puller unit comprises a plate for blocking access to the first and the second line and load terminals within the disconnect box when the puller unit is installed.

22. The disconnect box of claim 21 wherein the front face and the rear face of the plate each have indicia disposed thereon for indicating whether the first and the second fuses are in the operational position or the non-operational position.

23. The disconnect box of claim 21 wherein the plate has a first slot and a second slot disposed therein.

24. The disconnect box of claim 23 further comprising a first projection disposed in the disconnect box for being received in the first slot when the puller unit is inserted into the disconnect box and a second projection also disposed in the disconnect box for being received in the second slot when the puller unit is inserted into the disconnect box.

25. The disconnect box of claim 16 wherein the first and the second fuses are releasably secured in a first rectangular box and a second rectangular box, respectively, via snap-fit, the first and the second rectangular boxes being integrally formed with the puller unit.

26. The disconnect box of claim 25 wherein the first and the second rectangular boxes include at least one deformable tab for biasing the first and the second fuses against the first line and the first load terminals and the second line and the second load terminals, respectively.

27. The disconnect box of claim 16 wherein the first line and the first load terminals and the second line and the second load terminals have a concave side for contacting the first fuse and the second fuse, respectively.

28. The disconnect box of claim 16 wherein the first and the second fuses are releasably secured in a first cylinder and a second cylinder, respectively, via sliding engagement, the first and the second cylinders being integrally formed with the puller unit.

* * * * *